(12) United States Patent
Choi et al.

(10) Patent No.: US 10,618,255 B2
(45) Date of Patent: Apr. 14, 2020

(54) FLEXIBLE LAMINATE AND FLEXIBLE DISPLAY PROVIDED WITH SAME

(71) Applicants: Dow Corning Toray Co., Ltd., Tokyo (JP); Dow Silicones Corporation, Midland, MI (US)

(72) Inventors: Hojin Choi, Choongchongbuk-do (KR); Haruhiko Furukawa, Ichihara (JP); Maki Itoh, Ichihara (JP); Jeonggi Kim, Choongchongbuk-do (KR); Sunny Kim, Choongchongbuk-do (KR); Haruna Mizuno, Ichihara (JP); Michitaka Suto, Ichihara (JP); Takeaki Tsuda, Ichihara (JP)

(73) Assignees: Dow Toray Co., Ltd., Tokyo (JP); Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/096,177

(22) PCT Filed: Apr. 26, 2017

(86) PCT No.: PCT/JP2017/016525
§ 371 (c)(1),
(2) Date: Oct. 24, 2018

(87) PCT Pub. No.: WO2017/188308
PCT Pub. Date: Nov. 2, 2017

(65) Prior Publication Data
US 2019/0134946 A1    May 9, 2019

(30) Foreign Application Priority Data
Apr. 26, 2016   (JP) .................................. 2016-087767

(51) Int. Cl.
*B32B 7/12* (2006.01)
*H01L 51/50* (2006.01)
(Continued)

(52) U.S. Cl.
CPC ............... *B32B 7/12* (2013.01); *C09J 183/04* (2013.01); *G09F 9/30* (2013.01); *H01L 51/50* (2013.01);
(Continued)

(58) Field of Classification Search
CPC .... B32B 7/12; B32B 2307/51; B32B 2457/20
(Continued)

(56) References Cited

U.S. PATENT DOCUMENTS 5,789,485 A * 8/1998 Kobayashi ........... C09D 183/04
427/387
6,201,055 B1 * 3/2001 Lutz ...................... C09J 183/04
524/493

(Continued)

FOREIGN PATENT DOCUMENTS

CN    102051133 A    5/2011
CN    105102216 A    11/2015
(Continued)

OTHER PUBLICATIONS

International Search Report for WO Application No. PCT/JP2017/016525, dated Jul. 25, 2017, 4 pages.
(Continued)

*Primary Examiner* — Tahseen Khan
(74) *Attorney, Agent, or Firm* — Warner Norcross + Judd LLP

(57) ABSTRACT

A flexible laminate for which increased flexibility and improved durability can coexist, and a flexible display provided with same, are disclosed. The flexible laminate has at least one unit of a laminated structure in which two hard
(Continued)

layers closely adhere to each other with at least one intermediate layer therebetween. When the flexible laminate is bent, neutral planes are formed inside each of the hard layers that closely adhere to each other with the intermediate layer therebetween. The flexible laminate satisfies the following expression: $a \times \ln(\tan \delta \times E_T/0.01) \geq 100$. In the expression, a is any value ranging from 200 to 2,000, $\tan \delta$ represents a loss factor for a substance configuring the intermediate layer, and $E_T$ represents an elastic modulus (MPa) of the substance configuring the intermediate layer.

9 Claims, 3 Drawing Sheets

(51) Int. Cl.
    H05B 33/28       (2006.01)
    H05B 33/22       (2006.01)
    G09F 9/30        (2006.01)
    H05B 33/02       (2006.01)
    C09J 183/04      (2006.01)

(52) U.S. Cl.
    CPC ............ *H05B 33/02* (2013.01); *H05B 33/22* (2013.01); *H05B 33/28* (2013.01); *B32B 2250/02* (2013.01); *B32B 2255/26* (2013.01); *B32B 2307/40* (2013.01); *B32B 2307/51* (2013.01); *B32B 2307/536* (2013.01); *B32B 2307/54* (2013.01); *B32B 2307/546* (2013.01); *B32B 2457/20* (2013.01)

(58) Field of Classification Search
    USPC ........................................................ 428/212
    See application file for complete search history.

(56) References Cited

U.S. PATENT DOCUMENTS

| | | | |
|---|---|---|---|
| 9,012,547 | B2* | 4/2015 | Shope ................... C08L 83/06 |
| | | | 428/447 |
| 2011/0111220 | A1 | 5/2011 | Takarada et al. |
| 2013/0286462 | A1 | 10/2013 | Yeo et al. |
| 2015/0064831 | A1* | 3/2015 | Furihata ................ H01L 31/18 |
| | | | 438/64 |
| 2015/0185782 | A1 | 7/2015 | Kim et al. |
| 2015/0201487 | A1* | 7/2015 | Kee .................. G02F 1/133305 |
| | | | 361/749 |
| 2015/0267399 | A1* | 9/2015 | Uno ........................ E04B 1/665 |
| | | | 428/215 |
| 2016/0053130 | A1 | 2/2016 | Suzuki et al. |
| 2016/0226015 | A1* | 8/2016 | Kauhaniemi ....... H01L 51/5246 |
| 2018/0258332 | A1 | 9/2018 | Song et al. |

FOREIGN PATENT DOCUMENTS

| | | | | |
|---|---|---|---|---|
| EP | 2894672 A1 | 7/2015 | | |
| JP | 2009229667 A | 10/2009 | | |
| JP | 2014153711 A | 8/2014 | | |
| JP | 2015206997 A | 11/2015 | | |
| KR | 101579710 B1 * | 12/2015 | ............... | B32B 7/12 |
| KR | 101579710 B1 | 12/2015 | | |

OTHER PUBLICATIONS

English language abstract and machine translation for JP2009229667 (A) extracted from espace.net database on Oct. 19, 2018, 33 pages.
English language abstract and machine translation for JP2015206997 (A) extracted from espace.net database on Oct. 19, 2018, 42 pages.
Soonkwang Hong et al., "Information Display", Jan./Feb. 2015, vol. 31, No. 1, p. 6-11, "Technologies for Flexible AMOLEDs".
Jing-Yi Yan et al., "Information Display", Jan./Feb. 2015, vol. 31, No. 1, p. 12-16, "Foldable AMOLED Display Development Progress and Challenges".

* cited by examiner

FLEXIBLE LAMINATE AND FLEXIBLE DISPLAY PROVIDED WITH SAME

CROSS-REFERENCE TO RELATED APPLICATIONS

This application is the National Stage of International Application No. PCT/JP2017/016525 filed on 26 Apr. 2017, which claims priority to and all advantages of Japanese Patent Application No. 2016-087767 filed on 26 Apr. 2016, the content of which is hereby incorporated by reference.

TECHNICAL FIELD

The present invention relates to a flexible laminate and a flexible display provided with the same. More particularly, the present invention relates to a flexible laminate capable of realizing desired flexibility and improving durability and a flexible display provided with the same.

BACKGROUND ART

Conventionally, a display has been used for various electric and electronic devices. As a display, a display having a structure which is not bent has been generally used so far, but in recent years, a flexible display having a bendable structure is getting attention. As the conventional flexible display, there is a flexible display in which an electrode layer, a light emitting layer, and a protective layer are laminated on a flexible substrate (for example, Patent Literature 1). According to such a flexible display, since a screen is bendable, it is convenient to carry and store electric and electronic devices. Non-Patent Literature 1 discloses, as an example of a flexible AMOLED device, a flexible laminate including a base layer for backup, a light emitting layer such as an OLED layer, an electrode layer such as an ITO layer, and a base layer for protection in order. Specifically, p. 7 and FIG. 4 of Non-Patent Literature 1 shows a schematic configuration of a flexible display. In addition, Non-Patent Document 2 (for example, p. 15 of the same document) presents a concept of a neutral plane in a flexible laminate at the time of folding in a foldable AMOLED device.

CITATION LIST

Patent Literature

Patent Literature 1: Japanese Patent Application Laid-Open No. 2014-153711

Non-Patent Literature

Non-Patent Literature 1: "Information DISPLAY", JANUARY/FEBRUARY 2015, VOL. 31, No. 1 p. 6-11, "Technologies for Flexible AMOLEDs" (Soonkwang Hong et al)
Non-Patent Literature 2: "Information Display", JANUARY/FEBRUARY 2015, VOL. 31, No. 1 p. 12-16, "Foldable AMOLED Display Development: Progress and Challenges" (Jing-Yi Yan et al)

SUMMARY OF INVENTION

Technical Problems

A flexible display has required highly functional and highly storable specifications so as to have bendable, foldable, and rollable functions. In addition, there is a growing need for display manufacturers to provide displays that are more durable and cost effective and can stably provide highly flexible functions in order to differentiate their products.

However, since a plurality of hard layers such as a protective layer, a light emitting layer, and an electrode layer are laminated, a thickness of a display intended to be flexible is thick and therefore hardly bent. For this reason, if the display is forcibly bent to be compact, the display is applied with internal stress exceeding an interlayer adhesive force and is damaged due to peeling or the like, such that the display is hardly put into practical use.

In order to prevent the flexible display from being damaged due to the internal stress, it is also conceivable to more firmly fix the laminated substrates of the flexible display. However, even if the laminated substrates are firmly fixed to each other, the bending stress reaches the strength of the laminated substrates at the time of the folding or the bending stress is increased due to the lamination, such that the fact that the flexible display tends to be damaged remains unchanged. To cope with the above problem, typically, the light emitting layer which tends to be most vulnerable was disposed at a central part of the laminated substrates. There is no effective means to solve this problem yet.

In addition, the laminated substrates have various physical properties, but it was not well known how to control and design the physical properties of each layer. Therefore, it is difficult to predict to what extent the laminated substrate has durability until a durability test is performed on the actually manufactured laminated substrate.

The present invention has been made to solve the problems of the prior art, and it is an object of the present invention to provide a flexible laminate capable of improving flexibility and durability and a flexible display provided with the same.

Solutions to Problems

As a result of intensive studies on the above problems, the present inventors have reached the present invention. That is, the object of the present invention is achieved by a flexible laminate, which has at least one unit of a laminated structure in which two hard layers closely adhere to each other with at least one intermediate layer therebetween, wherein when the flexible laminate is bent, neutral planes are formed inside each of the hard layers that closely adhere to each other with the intermediate layer therebetween, and the flexible laminate satisfies the following expression:

$$a \times \ln(\tan \delta \times E_T / 0.01) \geq 100$$

(wherein a is any number ranging from 200 to 2000, tan δ represents a loss factor of a substance configuring the intermediate layer, and $E_T$ represents an elastic modulus (MPa) of the substance configuring the intermediate layer and is defined by an apparent elastic modulus obtained by dividing a true stress by a true strain after a stress/strain curve is converted into a true stress/true strain curve when a tensile tester performs a tensile test under the condition that room temperature is 25° C. and a strain rate is 0.0525 (1/s)).

In the flexible laminate of the present invention, in the case in which the flexible laminate is bent, when with respect to one unit of the laminate structure, the elastic modulus of the substance configuring the hard layer is $E_H$, a geometrical moment of inertia of the hard layer is $I_H$, and a geometrical moment of inertia of the intermediate layer is $I_T$, a value of $E_H \times I_H$ is preferably 10 times or more a value of $E_T \times I_T$.

In the flexible laminate of the present invention, in the case in which the flexible laminate is bent, a storage elastic modulus G' of the substance configuring the intermediate layer at 0.1 Hz and 25° C. is preferably in a range of 1.0 kPa to 1 M (1000 k) Pa. In addition, the storage elastic modulus G' at 10.0 Hz and 25° C. of the substance configuring the intermediate layer is twice or more the storage elastic modulus G' at 0.01 Hz and at 25° C.

The loss factor tan δ at 1 Hz of the substance configuring the intermediate layer included in the flexible laminate of the present invention is preferably in a range of 0.2 to 5.0 in a range of −40° C. to 100° C.

The elastic modulus $E_T$ of the substance configuring the intermediate layer included in the flexible laminate of the present invention is preferably in a range of 0.050 to 0.200 MPa.

In the expression satisfied by the flexible laminate of the present invention, the hard layer and the intermediate layer are selected so that the value of a is in the range of 200 to 2000, and the storage elastic modulus G' of the substance configuring the intermediate layer at 1.0 Hz and −20° C. is preferably three times or more the storage elastic modulus G' at 1.0 Hz and at 25° C.

The intermediate layer included in the flexible laminate of the present invention is preferably a cured product formed of a curable silicone composition that includes
(A) a linear or branched organopolysiloxane having at least one cure-reactive functional group in a molecule on average,
(B) an organopolysiloxane resin, and
(C) a curing agent.

In the case where the intermediate layer included in the flexible laminate of the present invention contains the organopolysiloxane resin, the organopolysiloxane resin is formed of a unit (M unit) of $R_3SiO_{1/2}$ (wherein R's represent monovalent organic groups independently of each other) and a $SiO_{4/2}$ unit (Q unit), and preferably has or does not have a hydroxyl group or a hydrolyzable group.

In the case where the intermediate layer included in the flexible laminate of the present invention is the cured product of the curable silicone composition, the curable silicone composition may be a peroxide curing type to be cured with peroxide, a hydrosilylation reaction curing type to be cured by a platinum-based catalyst, and a condensation reaction curing type, but since it can be cured at a relatively lower temperature and shorter time, the hydrosilylation reaction curing type is preferably used.

The flexible laminate of the present invention preferably includes at least one of at least one laminated structures in which at least one of hard layers closely adhering to each other with the intermediate layer therebetween is a light emitting layer, and the other of the hard layers is selected from a support layer, an optical functional layer, a protective layer, and a transparent electrode layer.

In addition, the present invention also relates to the flexible display provided with the flexible laminate of the present invention.

Advantageous Effects of Invention

According to the present invention, since the loss factor and the elastic modulus of the substance configuring the intermediate layer have a specific relationship, it is possible to suitably design the intermediate layer formed between the two hard layers. That is, the flexible laminate formed has excellent flexibility and durability, and can greatly reduce the damage of the flexible laminate.

In addition, although the intermediate layer is set to be one for the purpose of bonding two hard layers to each other, according to the present invention, the intermediate layer can form the flexible laminate having excellent adhesive force. Therefore, it is possible to effectively suppress the flexible laminate from being damaged due to the peeling between the hard layer and the intermediate layer.

In addition, the flexible laminate according to the present invention has the excellent recovery characteristics. That is, even when the flexible laminate is bent, since the stress can be greatly alleviated, it is possible to improve, in particular, the durability of the flexible laminate.

DESCRIPTION OF EMBODIMENTS

Figure 1:
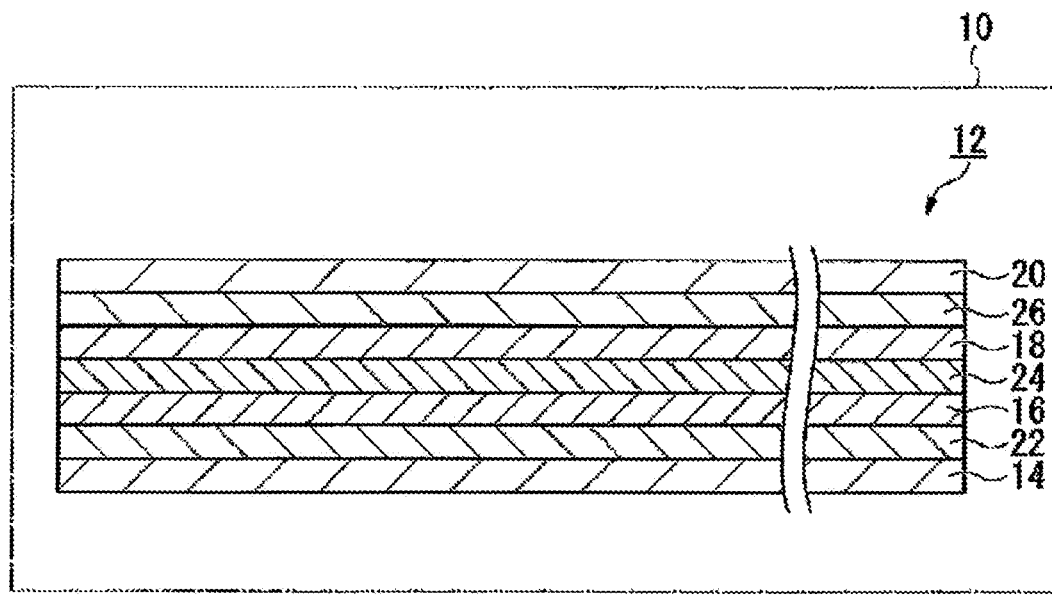
FIG. 1 is a diagram schematically showing a flexible display using a flexible laminate according to one embodiment of the present invention.

According to the present invention, a flexible laminate has at least one unit of a laminated structure in which two hard layers closely adhere to each other with at least one intermediate layer therebetween, when the flexible laminate is bent, neutral planes are formed inside each of the hard layers that closely adhere to each other with the intermediate layer therebetween,
the flexible laminate satisfies the following expression:

$$a \times \ln(\tan \delta \times E_T/0.01) \geq 100$$

(wherein a represents a physical property value inherent to the hard layer, and is preferably 200 to 2000 in the case of typical substances used for the flexible display, tan δ represents a loss factor of a substance configuring the intermediate layer, and $E_T$ represents an elastic modulus (MPa) of the substance configuring the intermediate layer).

In this specification, the "loss factor" is a value represented by a ratio (G"/G') of a loss elastic modulus (G") to a storage modulus (G') and can be measured by the known measurement method. For example, the loss factor can be measured using an MCR 301 viscoelasticity measuring device (manufactured by Anton Paar), and can be measured by using a disk-like sample having a diameter of 8 mm and a thickness of 1 mm in a range of a use temperature of −40° C. to 100° C. at a 8 mm parallel plate, a frequency of 1 Hz, a strain of 0.1%, and a temperature rising rate of 3° C./min. The loss factor tan δ used in the present specification may be a value at 25° C. The value of the loss factor of the substance configuring the intermediate layer used in the present invention is preferably in a range of 0.2 to 5.0, and more preferably in a range of 0.3 to 3.0.

For the measurement of the elastic modulus in this specification, an apparent elastic modulus obtained by dividing a true stress by a true strain after a stress/strain curve is converted into a true stress/true strain curve when a tensile tester performs a tensile test under the condition that room temperature is 25° C. and a strain rate is 0.0525 (1/s) is used. At this time, in order to obtain stable data, the minimum elastic modulus at 10 to 100% of the value of the true strain is defined as a representative value. The value of the elastic modulus of the substance configuring the intermediate layer used in the present invention is preferably in a range of 0.050 to 0.200 MPa, and more preferably in a range of 0.055 to 0.150 MPa.

In the flexible laminate of the present invention, when the flexible laminate in which two hard layers closely adhere to each other with the intermediate layer therebetween is bent, the hard layers on one side closely adhering to the intermediate layer are shifted with respect to the hard layers on the other in a direction parallel to a laminated plane direction, that is, the hard layers on one side and the hard layers on the other side are bent independently of each other by the intermediate layer, such that it is possible to greatly reduce the interference of stress between the hard layers. Therefore, it is possible to greatly prevent the flexible display from being damaged.

Further, in order to ensure that the plurality of hard layers bend independently of each other and prevent the laminate from being damaged due to the stress caused by the bending, in the flexible laminate of the present invention, neutral planes are formed inside each of the hard layers. That is, there are neutral planes in the laminate as many as the number of hard layers. Here, the neutral plane is a plane on which a mechanical stress in a horizontal direction becomes zero in the substrate at the time of deformation such as folding of a flat substrate.

As described above, the substance configuring the intermediate layer used in the flexible laminate of the present invention is characterized in that when the loss factor of the substance configuring the intermediate layer is tan δ and the elastic modulus of the substance configuring the intermediate layer is $E_T$, a value of the expression: $a \times \ln(\tan \delta \times E_T/0.01)$ is 100 or more. The value of the expression: $a \times \ln(\tan \delta \times E_T/0.01)$ is preferably 200 or more, more preferably 400 or more, and most preferably 500 or more.

The factor a is any value in the range of 200 to 2000, and when any value within the range is used, the value of the above expression becomes 100 or more. The a represents the physical property value inherent to the hard layer, and is in the range of 200 to 2000 and preferably in the range of 400 to 1800 in the case of the typical substances used for the flexible display. The value of the factor a can be measured as an approximate value, and can be calculated as a value obtained by dividing an adhesive force N (g/inch) by $\ln(\tan \delta \times E_T/0.01)$ when the intermediate layer is peeled off at 180° and a speed of 0.3 m/min while adhering to the hard layer, which becomes a value inherent to the hard layer and the intermediate layer. However, when the hard layers with the intermediate layer therebetween are different, a side having a weak adhesive force is taken as a reference. In addition, the factor a is preferable to take a value of about 300 to 1000 for a flexible substrate, particularly a resin (plastic)-based material applicable to the flexible display, and can be calculated using values of 300, 500, 600, 700, 800, or 900 individually depending on types of resin substrates. More preferably, it is particularly preferable to perform, in practical use, the calculation by setting a to be 500 for a substrate of general polyethylene terephthalate (PET) or polyimide (PI), a to be 400 for a resin substrate which is generally more flexible than PET, and a to be 900 for a resin substrate which is generally less flexible than PET. For example, the factor a is about 1200 for glass, about 900 for a cycloolefin polymer and polymethyl methacrylate, and 500 for polyethylene terephthalate and polyimide.

Conventionally, the adhesive layer of the laminate is designed in consideration of the loss factor, but it is insufficient to use only the loss factor as an index indicating the adhesive force of the adhesive layer. That is, one of the features of the present invention is that a product of the loss factor and the elastic modulus shows a very good correlation with the adhesive force. Therefore, by satisfying the predetermined expression of the present invention, it is possible to design the flexible laminate having the excellent interlayer adhesive force and flexibility.

In addition, it is also possible to use the conventional physical or chemical treatment method to further improve the interlay adhesive force in the laminate. Examples of the conventional physical or chemical treatment methods may include a method for roughening a surface to improve a mechanical bonding strength or a method for performing acid or alkaline treatment to increase a chemical bonding strength, and the like. Even in this case, since the product of the loss factor and the elastic modulus shows a very good correlation with the adhesive force, the product of the loss factor and the elastic modulus can be used as the index of the adhesive force and it is possible to design the flexible laminate having the excellent interlayer adhesive force.

In the flexible laminate of the present invention, preferably, in the case in which the flexible laminate is bent, when with respect to one unit of the laminate structure, an elastic modulus of the substance configuring the hard layer is $E_H$, a geometrical moment of inertia of the hard layer is $I_H$, and a geometrical moment of inertia of the intermediate layer is $I_T$, a value of $E_H \times I_H$ can be designed to be 10 times or more, preferably 15 times, and more preferably 20 times a value of $E_T \times I_T$. In the flexible laminate designed in this way, the neutral plane is not present inside the intermediate layer but present inside the hard layer, such that the durability of the flexible laminate can be improved. In addition, when the flexible laminate has the plurality of laminated structure unit (that is, laminate of four or more layers), the value of $E_H \times I_H$ is preferably at least 10 times the value of $E_T \times I_T$ for each laminated structure unit configuring the laminate. If the value of $E_H \times I_H$ approximates the value of $E_T \times I_T$ (specifically, less than 10 times), then the hard layer and the intermediate layer of the laminate in the laminated structure unit are highly likely to perform a close behavior integrally and the neutral plane is formed inside the intermediate layer at the time of the folding, such that there is a case in which the flexible laminate is damaged or an interface is peeled.

In the flexible laminate of the present invention, when the flexible laminate is bent, the neutral plane to which the stress is not applied is necessarily present inside the hard layer even if the position of the neutral plane to which a stress is not applied is moved between the interface between the hard layers on one side and the interface between the hard layers on the other side, and the neutral plane is not formed in the intermediate layer even at the time of folding at 90° to 180°. According to the present invention, since the plurality of hard layers are bent independently of each other, the neutral plane is present inside each flat plate member (hard layer) configuring the flexible laminate, so that there is no occurrence of destruction, interfacial peeling or the like between the layers configuring the laminate, thereby preventing the flexible display from being damaged and stably forming the integrated flexible laminate.

In the flexible laminate of the present invention, when the flexible laminate is bent, the storage elastic modulus G' at 0.1 Hz of the substance configuring the intermediate layer is preferably in a range of 1.0 kPa to 1 M (1000 k) Pa, more preferably 1.5 kPa to 800 kPa, and most preferably 2.0 kPa to 600 kPa. In addition, the storage elastic modulus G' at 10.0 Hz and 25° C. is preferably twice or more and more preferably three times or more the storage elastic modulus G' at 0.01 Hz and at 25° C.

In the expression satisfied by the flexible laminate of the present invention, it is preferable that the hard layer and the intermediate layer are selected so that the value of a is in the range of 200 to 2000, and it is more preferable that the hard layer and the intermediate layer are selected so that the value of a is in the range of 400 to 1800. In addition, in the intermediate layer of the flexible display of the present invention, it is preferable that the storage elastic modulus G' at 1.0 Hz and −20° C. is three times or more the storage elastic modulus G' at 1.0 Hz and at 25° C.

It is preferable that the flexible laminate of the present invention includes a support mechanism. Here, the support mechanism clamps the flexible laminate from a laminated direction so that when the flexible laminate is bent, the hard layers on one side closely adhering to the intermediate layer is shifted with respect to the hard layers on the other side with the intermediate layer therebetween only in a direction substantially parallel to a laminated plane direction via the intermediate layer. Such a sandwiched structure is not particularly limited, and can have a desired structure as long as the hard layer is not substantially deformed or moved in the laminated direction, and the sandwiched sites and the sandwiched number are also not limited.

In the flexible laminate of the present invention, when the flexible laminate is bent, it is preferable that a step is formed at an end of the flexible laminate. Here, the steps correspond to the shift of the hard layers on one side closely adhering to the intermediate layer with respect to the hard layer on the other side with the intermediate layer therebetween.

In the flexible laminate of the present invention, it is preferable that when the flexible laminate is bent at a constant radius of curvature so as to have a substantially U-letter shape, the intermediate layer is configured to substantially satisfy the relationship represented by the following relational expressions (1) to (3), and in a maximum shear strain region when the flexible laminate is bent, a breaking strain inherent to a substance exceeds a maximum shear strain defined by the following relational expression (5) and in the maximum shear strain region when the flexible laminate is bent, the breaking shear strain inherent to the substance exceeds a maximum shear stress defined by the following relational expression (4). That is, in the flexible laminate according to the present invention, it is preferable that the flexible laminate has a structure represented by the relational expressions (1) to (3), and physical properties inherent to the substance configuring the intermediate layer exceed a lower limit of physical properties given by the relational expressions (4) and (5), that is, the intermediate layer (substance) is adopted. By satisfying such structural and substance conditions, the object of the present invention can be suitably accomplished.

$$R_1\theta_1 = R_2\theta_1 \quad (1)$$

$$R_2 - R_1 = t + (h_1 + h_2)/2 \quad (2)$$

$$L = (\theta_1 - \theta_2)(R_1 + R_2)/2 \quad (3)$$

$$\tau_{xy} = G \times L/t \quad (4)$$

$$\gamma(=2\varepsilon_{xy}) = L/t \quad (5)$$

However, in the above relational expressions (1) to (5), $R_1$ is a bending radius at a center in a thickness direction of the hard layer on one side adhering to the intermediate layer. $R_2$ is a bending radius at a center in a thickness direction of the hard layer on the other side adhering to the intermediate layer. $\theta_1$ is a bending angle at the center in the thickness direction of the hard layer on one side adhering to the intermediate layer. $\theta_2$ is a bending angle at the center in the thickness direction of the hard layer on the other side adhering to the intermediate layer. t is a thickness of the intermediate layer. $h_1$ is the thickness of the hard layer on one side adhering to the intermediate layer. $h_2$ is the thickness of the hard layer on the other side adhering to the intermediate layer. L is a shift amount of the hard layer on one side closely adhering to the intermediate layer with respect to the hard layer on the other side, at a curvature end portion of the radius of curvature $(R_1+R_2)/2$. $\tau_{xy}$ is a shear stress of the intermediate layer. G is a shear elastic modulus of the intermediate layer. $\gamma$ ($=2\varepsilon_{xy}$) is the shear strain of the intermediate layer. $\varepsilon_{xy}$ is a strain tensor.

In the flexible laminate of the present invention, it is preferable that the shift amount L of the hard layer on one side with respect to the hard layer on the other side at the curvature end portion of the radius of curvature $(R_1+R_2)/2$ is substantially the same as the shift amount of the hard layer on one side with respect to the hard layer on the other side at the end of the flexible laminate. Here, the fact that the shift amounts are substantially the same means that the difference between the shift amounts is within about 5%, preferably within about 1%, and most preferably within about 0.5%.

In the flexible laminate of the present invention, it is preferable that one end portion of the flexible laminate layer can be bent with respect to the other end portion of the flexible laminate by 90° or more.

The substance configuring the intermediate layer in the flexible laminate of the present invention is not particularly limited as long as it satisfies the predetermined expressions of the present invention. For example, as the substance, at least one selected from the group consisting of a silicone-based pressure-sensitive adhesive, an acrylic pressure-sensitive adhesive, and a urethane-based pressure-sensitive adhesive can be used. The acrylic pressure-sensitive adhesive can be selected from the viewpoint of economical efficiency, adhesive property to other substrates, and durability, and the silicone-based pressure-sensitive adhesive can be selected from the viewpoint of heat resistance, cold resistance and durability.

In the flexible laminate of the present invention, the intermediate layer is preferably the silicone-based pressure-sensitive adhesive, and in particular, the intermediate layer is preferably a cured product formed of a curable silicone composition that includes (A) a linear or branched organopolysiloxane having at least one cure-reactive functional group in a molecule on average, (B) an organopolysiloxane resin, and (C) a curing agent.

The organopolysiloxane resin (B) is a component that imparts an adhesive force to the hard layer and is not particularly limited as long as it is organopolysiloxane having a three-dimensional network structure. Examples of the organopolysiloxane resin may include a resin which is formed of an $R_2SiO_{2/2}$ unit (D unit) and an $RSiO_{3/2}$ unit (T unit), (wherein R's represent monovalent organic groups independently of each other) and has or has no hydroxyl group or hydrolyzable group, a resin which is formed of a T unit alone and has a hydroxyl group or a hydrolyzable group, a resin which is formed of an $R_3SiO_{1/2}$ unit (M unit) and a $SiO_{4/2}$ unit (Q unit) and has or has no hydroxyl group or hydrolyzable group, and the like. In particular, it is preferable to use a resin (also referred to as an MQ resin) which is formed of an $R_3SiO_{1/2}$ unit (M unit) and a $SiO_{4/2}$ unit (Q unit) and has or has no hydroxyl group or hydrolyzable group. The hydroxyl group or the hydrolyzable group are directly bonded to the T unit or the Q unit in the resin, and are groups produced by hydrolyzing those derived from silane or silane which is a raw material.

The monovalent organic group of R is preferably a monovalent hydrocarbon group having 1 to 10 carbon atoms, and examples of the monovalent organic group of R may include an alkyl group having 1 to 10 carbon atoms, an alkenyl group having 2 to 10 carbon atoms, an aryl group having 6 to 10 carbon atoms, a cycloalkyl group having 6 to 10 carbon atoms, a benzyl group, a phenylethyl group, and a phenylpropyl group. In particular, 90 mol % or more of R is preferably an alkyl group having 1 to 6 carbon atoms or a phenyl group, and 95 to 100 mol % or more of R is particularly preferably a methyl group.

When the organopolysiloxane resin (B) is a resin formed of an $R_3SiO_{1/2}$ unit (M unit) and a $SiO_{4/2}$ unit (Q unit), a molar ratio of the M unit to the Q unit is preferably 0.5 to 2.0. When the molar ratio is less than 0.5, the adhesive force to the hard layer is lowered, and when the molar ratio is larger than 2.0, a cohesion of the substance configuring the intermediate layer is lowered. In addition, a D unit and a QT unit can be contained in the component (B) within the range in which the characteristics of the present invention are not damaged, and the component (B) can use at least two organopolysiloxanes together. The organopolysiloxane may have a certain amount of hydroxyl group or hydrolyzable group, and can be used without being limited even though it is the resin having the hydroxyl group or the hydrolysable group, the resin having no hydroxyl group or hydrolyzable group, or a mixture thereof. When the organopolysiloxane has the hydroxyl group or the hydrolyzable group, it generally contains 0.1 to 5.0% by mass of hydroxyl group or hydrolyzable group.

A curing system of the curable silicone composition is not particularly limited, and the known curing systems can be used. Examples of the curing system may include a curing system of a peroxide curing type that is cured with peroxide, a curing system of a hydrosilylation reaction curing type that is cured with a platinum-based catalyst, and a curing system of a condensation reaction curing type. The peroxide curing type curable silicone composition usually contains alkenyl group-containing diorganopolysiloxane and is cured by the action of the peroxide under high temperature. The hydrosilylation reaction curing type curable silicone composition is usually cured by the hydrosilylation reaction between a vinyl group in the diorganopolysiloxane with a SiH group (silicon atom-bonded hydrogen atom) in the organohydrogenpolysiloxane by the action of the platinum-based catalyst. The condensation reaction curing type curable silicone composition is usually cured by the condensation reaction between a silanol group such as diorganopolysiloxane or a hydrolyzable group under the action of the condensation reaction catalyst. In particular, since it can be cured at a relatively lower temperature and shorter time, it is preferable to use a hydrosilylation reaction curing type curable silicone composition which is cured by the hydrosilylation reaction.

When the hydrosilylation reaction curing type curable silicone composition is used as the curable silicone composition, the curable reactive functional group of the organopolysiloxane (A) is an alkenyl group, particularly an alkenyl group having 2 to 10 carbon atoms. Examples of the alkenyl group having 2 to 10 carbon atoms include a vinyl group, an allyl group, a butenyl group, a hexenyl group, and the like. Preferably, the alkenyl group having 2 to 10 carbon atoms is a vinyl group. The organopolysiloxane (A) may contain only a single component or may be a mixture of at least two different components.

Preferably, the organopolysiloxane (A) is linear. The properties of the component (A) at room temperature may be an oil shape or a raw rubber shape, and the viscosity of the component (A) is preferably 50 mPa·s or more and particularly preferably 100 mPa·s or more at 25° C. In particular, when the curable silicone composition is a solvent type, the component (A) is preferably raw rubber-like alkenyl-containing organopolysiloxane which has a viscosity of 100,000 mPa·s or more at 25° C. or plasticity (value obtained by applying a load of 1 kgf to a 4.2 g of spherical sample at 25° C. for 3 minutes) which is measured according to the method specified in JIS K6249 is in a range of 5 to 200 and more preferably a range of 80 to 180. However, even the component (A) having a lower viscosity can be used.

When there is the component (A) or the component (C), the sum of the components (A) and (C) and the blending amount of component (B) are preferably 1 to 500 parts by mass of the component (B), more preferably 30 to 400 parts by mass of the component (B) with respect to 100 parts by mass of the component (A) or the total of the components (A) and (C). When the content of the component (B) is less than the lower limit or exceeds the upper limit, adhesiveness may be insufficient.

When the hydrosilylation reaction-curing type curable silicone composition is used as the curable silicone composition, the curing agent (C) is preferably organohydrogenpolysiloxane having at least two Si—H bonds in the molecule. In this case, the alkenyl group of the organopolysiloxane undergoes the hydrosilylation reaction with the silicon atom-bonded hydrogen atom of the organohydrogenpolysiloxane to be able to form the cured product of the curable silicone composition. The curing agent (C) may contain only a single component or may be a mixture of at least two different components.

When the hydrosilylation reaction curing type curable silicone composition is used as the curable silicone composition, the content of the curing agent (C) is adjusted so that a molar ratio of the silicon-bonded hydrogen atom (SiH) group in the component (C) to the alkenyl group in the composition is preferably in a range of 0.1 to 100 and more preferably a range of 0.2 to 50. If the molar ratio is larger than 100, the amount of curing agent remaining without reaction is increased, and if the molar ratio is smaller than 0.1, the curing may be insufficient.

In addition, when the hydrosilylation reaction curing type curable silicone composition is used as the curable silicone composition, the curable silicone composition may contain a hydrosilylation reaction catalyst (D) as an additional component. As the hydrosilylation reaction catalyst, a platinum-based catalyst, a rhodium-based catalyst, and a palladium-based catalyst are exemplified, and the platinum-based catalyst is preferable because of remarkably promoting the curing of the present composition. As the platinum-based catalyst, platinum fine powder, chloroplatinic acid, an alcohol solution of chloroplatinic acid, a platinum-alkenylsiloxane complex, a platinum-olefin complex, a platinum-carbonyl complex are exemplified, and the platinum-alkenylsiloxane complex is particularly preferable. Examples of the alkenylsiloxane may include 1,3-divinyl-1,1,3,3-tetramethyldisiloxane, 1,3,5,7-tetramethyl-1,3,5,7-tetravinylcyclotetrasiloxane, alkenyl siloxane in which a part of the methyl group of these alkenyl siloxanes are substituted with a group selected from the group consisting of nitriles, amides, dioxolanes, and sulfolanes, an ethyl group, a phenyl group, and the like, and alkenyl siloxane in which the vinyl group of these alkenyl siloxanes is substituted with an allyl group, a hexenyl group, and the like. In particular, the 1,3-divinyl-1,1,3,3-tetramethyldisiloxane is preferable because the stability of the platinum-alkenylsiloxane complex is good. As a catalyst for promoting the hydrosilylation reaction, a non-platinum-based metal catalyst such as iron, ruthenium, and iron/cobalt may be used.

The content of the hydrosilylation reaction catalyst (D) is in a range in which a platinum metal amount is 1 to 5000 ppm, preferably 1 to 1000 ppm, and more preferably 1 to 200 ppm with respect to the total amount of the components (A) to (C). If the content of the hydrosilylation reaction catalyst (D) is less than 1 ppm, the curing rate may be slow or the curing may be insufficient, and if the content of the hydrosilylation reaction exceeds 5000 ppm, problems such as coloring may occur.

The curable silicone composition may contain components other than the above components within the range in which the characteristics of the composition are not damaged. Examples of the curable silicone composition may include a curing retardant; an adhesion promoter; a nonreactive organopolysiloxane such as polydimethylsiloxane or polydimethyldiphenylsiloxane; an antioxidant such as a phenol type, a quinone type, an amine type, a phosphorus type, a phosphite type, a sulfur type, or a thioether type; a light stabilizer such as a triazole type and a benzophenone type; a flame retardant such as a phosphate ester type, a halogen type, a phosphorus type, and an antimony type; at least one antistatic agents such as a cationic surfactant, an anionic surfactant, and a nonionic surfactant; dye; pigment; and the like.

The substance configuring the intermediate layer in the flexible laminate of the present invention can further include organic fine particles or inorganic fine particles. The organic fine particles or the inorganic fine particles are not particularly limited as long as they do not lower the optical characteristics of the intermediate layer, and examples thereof may include organic fine particles such as an acrylic resin, a polystyrene resin, a styrene-acrylic copolymer, a polyethylene resin, a polypropylene resin, a polyamide resin, an epoxy resin, a silicone resin, polyvinylidene fluoride resin, and a polyfluorinated ethylene resin, and inorganic fine particles such as alumina, aluminum hydroxide, silica, talc, calcium carbonate, magnesium carbonate, calcium silicate, iron oxide, magnesium oxide, titanium oxide, zinc oxide, zirconium oxide, tungsten oxide, silicon nitride, boron nitride, aluminum nitride, silicon carbide, and barium sulfate.

A method for preparing a substance configuring an intermediate layer in the flexible laminate of the present invention is not particularly limited, and is performed by homogeneously mixing the respective components. It may be with a solvent as needed, and may be prepared by mixing at a temperature of 0 to 200° C. using a known stirrer or kneader.

The substance configuring the intermediate layer in the flexible laminate of the present invention is coated on the hard layer to form a coating film and is heated under the temperature condition of 50 to 200° C. to be a cured product. Examples of the coating method may include gravure coating, offset coating, offset gravure, roll coating, reverse roll coating, air knife coating, curtain coating, and comma coating.

Hereinafter, a preferred embodiment of the present invention will be described with reference to the accompanying drawings. FIG. 1 shows a schematic view of a flexible display using a flexible laminate according to one embodiment of the present invention. FIG. 1 shows a flat state of the flexible display according to this embodiment.

A flexible display 10 shown in FIG. 1 includes a flexible laminate 12 having a flexible structure. In the flexible laminate 12, reference numerals 14, 16, 18 and 20 represent hard layers, which are provided with a base layer for backup, a light emitting layer such as an OLED layer, an inorganic layer such as an ITO layer, and a base layer for protection, and the like. In addition, reference numerals 22, 24 and 26 represent intermediate layers.

In the embodiment shown in FIG. 1, a laminated structure of the present invention has three units, includes a first laminated structure, a second laminated structure, and a third laminated structure, and is provided with four neutral planes. That is, in the flexible laminate 12 shown in FIG. 1, as the first laminated structure, the hard layer 14 and the hard layer 16 closely adhere to each other with an intermediate layer 22 therebetween. As the second laminated structure, the hard layer 16 and the hard layer 18 closely adhere to each other with the intermediate layer 24 therebetween. As the third laminated structure, the hard layer 18 and the hard layer 20 closely adhere to each other with the intermediate layer 26 therebetween.

Figure 2:
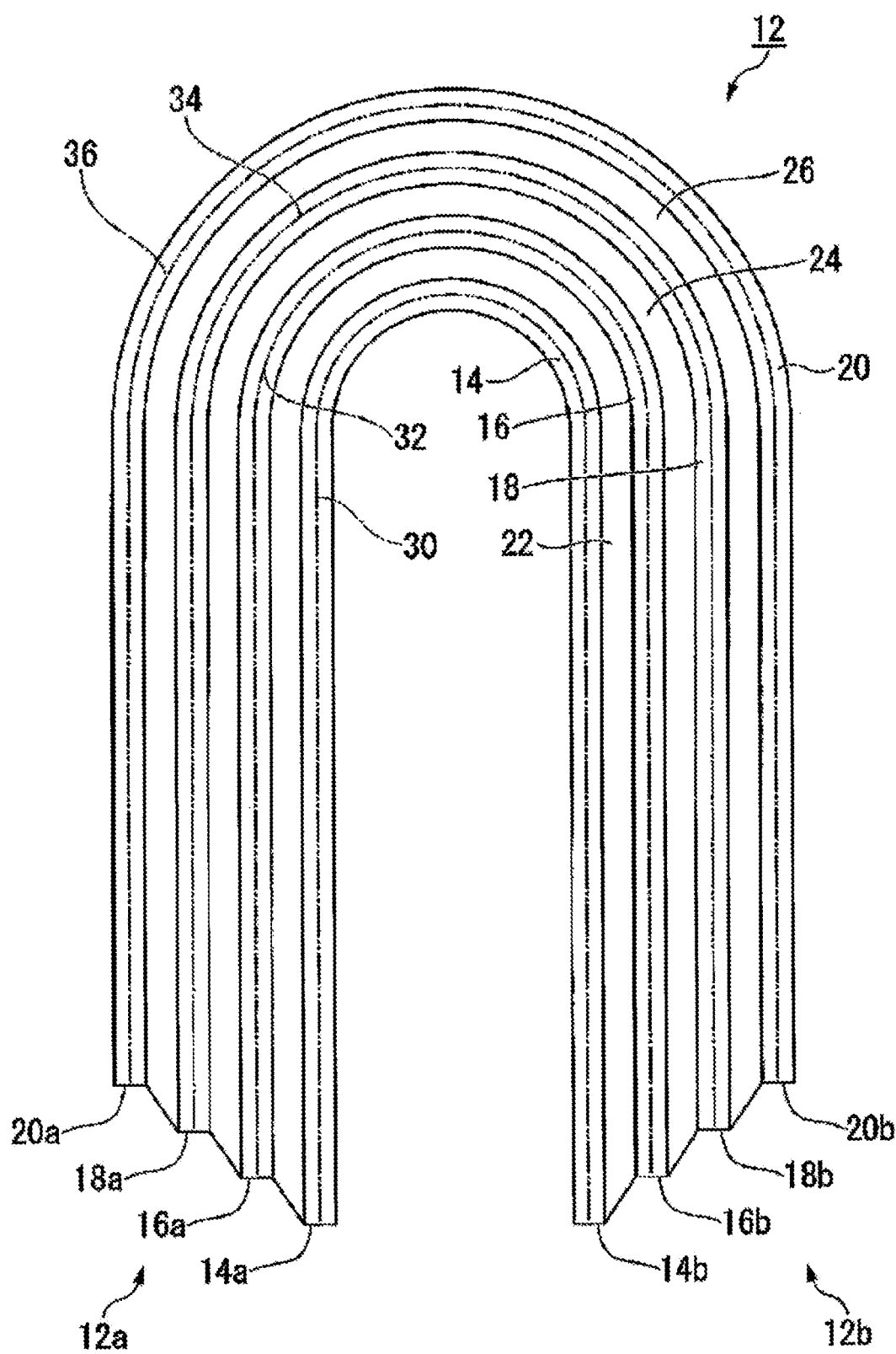
FIG. 2 is a diagram showing a state in which the flexible laminate shown in FIG. 1 is bent.

FIG. 2 shows a state in which the flexible laminate 12 shown in FIG. 1 is bent. In the present embodiment, the intermediate layer 22 forms a neutral plane 30 in the hard layer 14, and forms a neutral plane 32 in the hard layer 16. The intermediate layer 24 forms the neutral plane 32 in the hard layer 16, and forms a neutral plane 34 in the hard layer 18. The intermediate layer 26 forms the neutral plane 34 in the hard layer 18, and forms a neutral plane 36 in the hard layer 20.

Therefore, according to the present embodiment, the other end portion of the flexible display can be bent with respect to one end portion thereof by 90° or more without damaging the flexible display. For example, as shown in FIG. 2, even when the other end portion 12b of the flexible laminate 12 is bent by 180° with respect to one end portion 12a thereof, the damage to the flexible display can be greatly reduced. In addition, as shown in FIG. 2, when the flexible laminate 12 is bent, the shift occurs in a direction parallel to a laminated plane direction between the hard layer on one side and the hard layer on the other side closely adhering to each other with the intermediate layer therebetween. The substantially parallel direction ideally means that no deformation or movement occurs in the laminated direction at all, or even if it occurs, it is extremely slight, and it remains to a negligible level considering the thickness of the intermediate layer.

In this embodiment, at the one end portion 12a of the flexible laminate 12, one end portion 16a of the hard layer 16 is shifted upward with respect to one end portion 14a of the hard layer 14 in FIG. 2 (direction parallel to the laminated plane direction) by the intermediate layer 22. Even at the other end portion 12b of the flexible laminate 12, the other end portion 16b of the hard layer 16 is shifted upward in FIG. 2 with respect to the other end portion 14b of the hard layer 14 by the intermediate layer 22.

Similarly, at the one end portion 12a of the flexible laminate 12, one end portion 18a of the hard layer 18 is shifted upward in FIG. 2 with respect to one end portion 16a of the hard layer 16 by the intermediate layer 24. Even at the other end portion 12b of the flexible laminate 12, the other end portion 16b of the hard layer 16 is shifted upward in FIG. 2 with respect to the other end 18b of the hard layer 18 by the intermediate layer 22.

Similarly, at the one end portion 12a of the flexible laminate 12, one end portion 20a of the hard layer 20 is shifted upward in FIG. 2 with respect to one end portion 18a of the hard layer 18 by the intermediate layer 26. Even at the other end 12b of the flexible laminate 12, the other end portion 20b of the hard layer 20 is shifted upward in FIG. 2 with respect to the other end portion 18b of the hard layer 18 by the intermediate layer 26.

Therefore, as in the flexible laminate 12 according to the present embodiment, when the neutral planes are formed in all the hard layers, it can be observed that at the one end portion 12a of the flexible laminate 12, a step is continuously formed from one end portion 14a of the hard layer 14 over one end portion 16a of the hard layer 16, one end portion 18a of the hard layer 18, and one end portion 20a of the hard layer 20 when one end portion 14a (end portion on one side of the flexible laminate 12) and the other end portion 14b (end portion on the other side of the flexible laminate 12) are positioned on the same horizontal plane. Even at the other end portion 12b of the flexible laminate 12, it can be observed that a step is continuously formed from the other end portion 14b of the hard layer 14 over the other end portion 16b of the hard layer 16, the other end portion 18b of the hard layer 18, and the other end portion 20b of the hard layer 20.

On the other hand, in a general flexible laminate, since one neutral plane is formed only in one hard layer among a plurality of hard layers, end faces of the flexible laminate are flush, and therefore it is impossible to observe the step as shown in FIG. 2 on end faces of a general flexible laminate.

Therefore, in the present embodiment, it is possible to prevent an interference of force between the hard layers. That is, in the present embodiment, the interference of force between the hard layer 14 and the hard layer 16 can be prevented by the intermediate layer 22. The interference of force between the hard layer 16 and the hard layer 18 can be prevented by the intermediate layer 22. The interference of force between the hard layer 18 and the hard layer 20 can be prevented by the intermediate layer 22. In the present embodiment, it is possible to prevent the interference of force between the respective hard layers, so that the damage to the flexible laminate 12 can be greatly reduced even if the flexible laminate 12 is compactly bent.

In addition, by using a substance having a value of the expression: $a \times \ln(\tan \delta \times E_T/0.01)$ of 100 or more as the substance configuring the intermediate layer, the intermediate layer has an excellent adhesive force and the damage caused by peeling of the flexible laminate 12 can be greatly suppressed. Specifically, by using a substance having a value of the expression of $a \times \ln(\tan \delta \times E_T/0.01)$ of 100 or more for each of the substances configuring the intermediate layers 22, 24 and 26, the adhesive force between the hard layer 14 and the hard layer 16, the adhesive force between the hard layer 16 and the hard layer 18, and the adhesive force between the hard layer 18 and the hard layer 20 can be improved.

In the flexible laminate of the present invention, when the flexible laminate is bent, the hard layer on the one side closely adhering to the intermediate layer is smoothly shifted with respect to the hard layer on one side with the intermediate layer therebetween only in a direction substantially parallel to the laminated plane direction, so that the following support mechanism may be provided.

Figure 3:
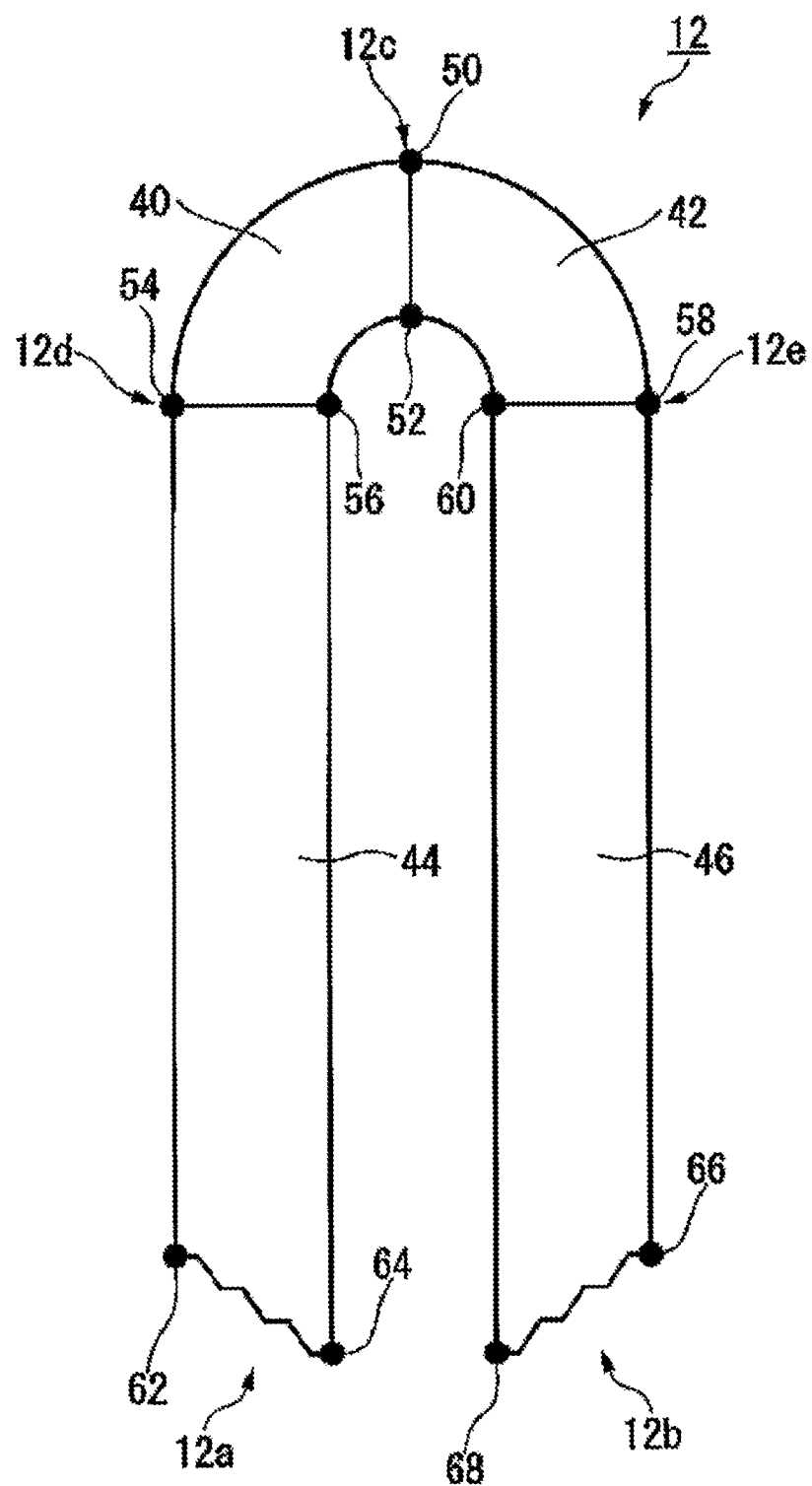
FIG. 3 is a diagram showing an operation of the flexible laminate according to one embodiment of the present invention.

Hereinafter, the support mechanism will be described more specifically with reference to FIG. 3. In FIG. 3, when the flexible laminate 12 is bent so as to form a U-letter shape, curvature portions 40 and 42 and linear portions 44 and 46 are formed in the flexible laminate 12.

In the embodiment shown in FIG. 3, support means 50, 52, 54, 56, 58, 60, 62, 64, 66, and 68 as the support mechanism are provided. That is, the support means 50 and 52 is opposed to each other having an intermediate portion 12c of the flexible laminate 12 sandwiched therebetween. The support means 50 and 52 clamps an intermediate portion 12c of the flexible laminate 12 so that the hard layer does not move in the lamination direction.

In FIG. 3, the support means 54 and 56 is opposed to each other having a curvature end portion 12d (boundary portion between the curvature portion 40 and the linear portion 44) on one side of the flexible laminate 12 clamped therebetween. The support means 54 and 56 clamps the curvature end portion 12d on one side of the flexible laminate 12 so that at the curvature end portion 12d on one side of the flexible laminate 12, each layer is shifted only in a direction substantially parallel to the laminated plane direction without being shifted in the laminated direction.

In FIG. 3, the support means 58 and 60 is opposed to each other having a curvature end portion 12e (boundary portion between the curvature portion 42 and the linear portion 46) on the other side of the flexible laminate 12 sandwiched therebetween. The support means 58 and 60 clamps a curvature end portion 12e on one side of the flexible laminate 12 so that at the curvature end portion 12e on the other side of the flexible laminate 12, each layer is shifted only in a direction substantially parallel to the laminated plane direction without being shifted in the laminated direction.

In the vicinity of the one end portion 12a of the flexible laminate 12, the support means 62 and 64 clamps the flexible laminate 12 from the laminated direction so that each hard layer configuring the flexible laminate 12 is shifted in a direction substantially parallel to the laminated plane direction without being shifted in the laminated direction. In the present embodiment, the support means 62 and 64 make the shift at the one end portion 12a of the flexible laminate 12 free without restraint. For this reason, the shift at the curvature end portion 12d on one side of the flexible laminate 12 is substantially similar to the shift at the one end portion 12a of the flexible laminate 12 while the state is also held in the linear portion 44. Here, the substantially similar shift means that lengths as the shift amount are substantially equal as shown in FIG. 3, and the difference in the length is within about 5%, preferably within about 1%, and most preferably about 0.5%.

Similarly, in the vicinity of the one end portion 12b of the flexible laminate 12, the support means 66 and 68 clamps the flexible laminate 12 from the laminated direction so that each hard layer configuring the flexible laminate 12 is shifted in a direction substantially parallel to the laminated plane direction without being shifted in the laminated direction. In the present embodiment, the support means 66 and 68 make the shift at the other end portion 12b of the flexible laminate 12 free without restraint. For this reason, the shift at the curvature end portion 12e on the other side of the flexible laminate 12 is substantially similar to the shift at the other end portion 12b of the flexible laminate 12 while the state is also held in the linear portion 46.

In this way, the support mechanism supports the flexible laminate 12 and permits the shift at the one end portion 12a of the flexible laminate 12 and the shift at the other end portion 12b of the flexible laminate 12 to make the shifts free, so that the neutral planes can be reliably formed in all the hard layers.

In the present embodiment, in order to securely hold the strain state at the curvature end portions 12*d* and 12*e* of the flexible laminate 12 even at the end portions 12*a* and 12*b* of the flexible laminate 12, the following points can be taken into consideration, which is very important.

At the maximum shear strain region (curvature end portions 12*d* and 12*e*), it is preferable that the breaking strain of the intermediate layer exceeds the maximum shear strain.

At the maximum shear strain region (curvature end portions 12*d* and 12*e*), it is preferable that the breaking shear stress of the intermediate layer exceeds the maximum shear stress.

In the maximum shear strain region (curvature end portions 12*d* and 12*e*), the durability of the hard layer preferably exceeds the maximum shear stress $\tau_{xy}$ (max)×S. However, S is the length of the linear portion 44 (46).

In the maximum shear strain region (curvature end portions 12*d* and 12*e*), it is preferable that $\tau_{xy}$ (max)×S is smaller than a buckling force F of the hard layer and the intermediate layer.

It is preferable that the shear strain/shear stress of the uppermost layer (for example, the hard layer 20 in FIG. 1) of the flexible laminate 12 and the shear strain/shear stress of the lowermost layer (for example, the hard layer 14 in FIG. 1) are the same in order to keep a balance.

The present invention also relates to a flexible display provided with the flexible laminate according to the present invention, but layers other than the flexible laminate according to the present invention can be provided. A manufacturing example of such a flexible laminate is not particularly limited, and the flexible laminate can be manufactured by the known means such as vapor deposition and pressure bonding.

It is to be noted that the flexible laminate and the flexible display of the present invention are not limited to the embodiments described in this specification, and can be variously modified without departing from the scope of the gist of the invention. For example, in the embodiment shown in FIG. 1, the unit of the laminated structure of the present invention is set to be 3 units, but the unit of the laminated structure of the present invention is not limited to 3 units, and can be set to be 1 unit, 2 units, 4 units or more. Further, in the embodiment in this specification, the examples in which the flexible laminate of the present invention is used for the flexible display has been described, but the flexible laminate of the present invention can also be used for applications other than the flexible display requiring the flexible laminate.

EXAMPLES

Examples of the present invention and Comparative Examples will be described below.
(Preparation of Curable Composition for Intermediate Layer)

Silicone curable compositions shown in Examples 1 to 6 and Comparative Example 1 were prepared.
(Peeling Test)

Each composition was coated on a release liner (one in which Q2-7785 release coating, which is manufactured by Dow Corning Corporation, is coated on a PET film having a thickness of 50 μm), and cured at 180° C. for 2.5 minutes so that the thickness thereof after curing became 50 μm. Thereafter, the same release liner was stuck thereto and aged at room temperature for one day. Two release liners were sequentially peeled off and stuck to a PET film (Lumirror S10, manufactured by Toray Industries, Inc.) having a thickness of 50 μm to prepare five strip-shaped test pieces each having a width of 20 mm and a length of 150 mm.

A short side of one of the prepared test pieces was fixed to a stainless steel bar having a diameter of 13 mm, a long side thereof was wound around the stainless steel bar, and the presence or absence of peeling and sites at which the peeling occurs up to arriving at a short side of the other of the prepared test pieces were confirmed as N=5. When the peeling did not occur within 15 cm for 5 test pieces, "No peeling (O)" was taken, and when the peeling occurs even for one test piece, "peeled (X)" was taken.
(Dynamic Viscoelasticity (Tan δ))

Each composition was poured into a tray so that the thickness after curing became about 1 mm, and stood at room temperature for one week to evaporate a solvent. Thereafter, it was heated and cured at 70° C. for 3 hours and subsequently at 180° C. for 30 minutes to prepare a cured sample with a thickness of about 1 mm.

The prepared cured sample was hollowed out to a diameter of 8 mm and attached to a parallel plate probe of a dynamic viscoelasticity apparatus (MCR 301 manufactured by Anoton Paar) for measurement. It was measured at a frequency of 1 Hz and a temperature rising rate of 3° C./min.
(Tensile Test)

Each composition was poured into a tray so that the thickness after curing became about 1 mm, and stood at room temperature for one week to evaporate a solvent. Thereafter, it was heated and cured at 70° C. for 3 hours and subsequently at 180° C. for 30 minutes to prepare a cured sample with a thickness of about 1 mm.

A cured surface of the prepared cured sample was punched out with No. 3 dumbbell to prepare a tensile test sample. The tensile test was carried out at a speed of 300 mm/min using Autograph AGS-X manufactured by Shimadzu Corporation. The strain was obtained from an elongation of an effective measurement site with a width of 5 mm and a length of 20 mm.

Table 1 shows substances of an intermediate layer curable composition.

TABLE 1

| Substance of curable composition | |
|---|---|
| Component name | Specification of component |
| Component A1 | Vinyl functional polydimethylsiloxane, Mw = 650,000, vinyl % = 0.01% |
| Component A2 | Vinyl functional polydimethylsiloxane, Mw = 600,000, vinyl % = 0.06% |
| Component B1 | MQ resin, Mw = 2,500, OH 3%, Solid content 72.6% |
| Component B2 | MQ resin, Mw = 3,200, OH 1%, Solid content 81.2% |
| Component B3 | MQ resin, Mw = 6,400, OH 1%, Solid content 77.4% |
| Component B4 | MQ resin, Mw = 7,100, OH 1%, Solid content 77.4% |
| Component C1 | Me2, MeH Copolysiloxane, Mw = 1600, H % = 0.73% |
| Component C2 | MeH polysiloxane, Mw = 3800, H % = 1.59% |
| Component D | Platinum catalyst, containing 0.62% of platinum |
| Component E1 | 1-Ethynyl-1-cyclohexanol |
| Component E2 | Maleic acid bis(2-methoxy-1-methylethyl) |

Note:
Each % in Table 1 indicates wt %.

Example 1

32.12 parts by weight of vinyl functional polydimethylsiloxane of the component A1, 1.51 parts by weight of MQ resin of the component B2, 29.10 parts by weight of MQ resin of the component B4, 0.23 parts by weight of MeH polysiloxane of the component C2, 0.02 parts by weight of curing retardant of the component E1, 0.16 parts by weight of curing retardant of the component E2, 44.70 parts by weight of toluene, and 25.58 parts by weight of xylene were mixed well at room temperature and 0.42 parts by weight of the platinum catalyst of the component D was added to the mixture to obtain the curable composition for the intermediate layer.

Comparative Example 1

36.94 parts by weight of vinyl functional polydimethylsiloxane of the component A1, 1.21 parts by weight of MQ resin of the component B2, 23.28 parts by weight of MQ resin of the component B4, 0.24 parts by weight of MeH polysiloxane of the component C2, 0.04 parts by weight of curing retardant of the component E1, 0.13 parts by weight of curing retardant of the component E2, 64.12 parts by weight of toluene, and 20.47 parts by weight of xylene were mixed well at room temperature and 0.43 parts by weight of the platinum catalyst of the component D was added to the mixture to obtain the curable composition for the intermediate layer.

Example 2

23.75 parts by weight of vinyl functional polydimethylsiloxane of the component A1, 1.25 parts by weight of vinyl functional polydimethylsiloxane of the component A2, 34.44 parts by weight of MQ resin of the component B1, 0.50 parts by weight of Me2, MeH copolysiloxane of the component C2, 0.10 parts by weight of curing retardant of the component E1, and 73.77 parts by weight of toluene were mixed well at room temperature and 0.50 parts by weight of platinum catalyst of the component D was added to the mixture to prepare the curable composition for an intermediate layer.

Example 3

32.97 parts by weight of vinyl functional polydimethylsiloxane of the component A1, 6.25 parts by of MQ resin of the component B2, 36.04 parts by weight of MQ resin of the component B3, 0.50 parts by weight of Me2, MeH copolysiloxane of the component C2, 0.10 parts by weight of curing retardant of the component E1, and 82.14 parts by weight of toluene were mixed well at room temperature and 0.50 parts by weight of platinum catalyst of the component D was added to the mixture to prepare the curable composition for an intermediate layer.

Example 4

24.42 parts by weight of vinyl functional polydimethylsiloxane of the component A1, 40.44 parts by of MQ resin of the component B2, 11.21 parts by weight of MQ resin of the component B3, 0.50 parts by weight of Me2, MeH copolysiloxane of the component C2, 0.10 parts by weight of curing retardant of the component E1, and 81.32 parts by weight of toluene were mixed well at room temperature and 0.50 parts by weight of platinum catalyst of the component D was added to the mixture to prepare the curable composition for an intermediate layer.

Example 5

25.00 parts by weight of vinyl functional polydimethylsiloxane of the component A1, 61.58 parts by MQ resin of the component B2, 0.20 parts by weight of Me2, MeH copolysiloxane of the component C2, 0.05 parts by weight of curing retardant of the component E1, and 61.38 parts by weight of toluene were mixed well at room temperature and 0.20 parts by weight of platinum catalyst of the component D was added to the mixture to prepare the curable composition for an intermediate layer.

Example 6

25.00 parts by weight of vinyl functional polydimethylsiloxane of the component A1, 73.89 parts by of MQ resin of the component B2, 0.20 parts by weight of Me2, MeH copolysiloxane of the component C2, 0.05 parts by weight of curing retardant of the component E1, and 61.71 parts by weight of toluene were mixed well at room temperature and 0.20 parts by weight of platinum catalyst of the component D was added to the mixture to prepare the curable composition for an intermediate layer.

Table 2 shows the physical properties of the cured products of the curable compositions prepared in Examples 1 to 6 and Comparative Example 1. The value of a of the hard layer (PET) configuring the laminate was 500, and this value was used to calculate the value of the expression: $a \times \ln(\tan \delta \times E_T/0.01)$. When the value calculated by the expression is 100 or more, the peeling of the laminate by the peeling test did not occur, but in Comparative Example 6 in which the value calculated by the expression is less than 100, the peeling of the laminate by the peeling test occurred.

TABLE 2

Physical properties of cured product of curable composition and results of peeling test

| | Tan δ | $E_T$ (MPa) | Tan $\delta \times E_T$ | a * ln (Tan δ $E_T$/ 0.01) | Peeling |
|---|---|---|---|---|---|
| Example 1 | 0.0868 | 0.165 | 0.014322 | 179.6 | ○[a] |
| Example 2 | 0.1481 | 0.125 | 0.0185125 | 307.9 | ○[a] |
| Example 3 | 0.1645 | 0.14 | 0.02303 | 417.1 | ○[a] |
| Example 4 | 0.4878 | 0.08 | 0.039024 | 680.8 | ○[a] |
| Example 5 | 0.8299 | 0.07 | 0.058093 | 879.7 | ○[a] |
| Example 6 | 1.734 | 0.075 | 0.13005 | 1282.7 | ○[a] |
| Comparative Example 1 | 0.0592 | 0.2 | 0.01184 | 84.4 | X[b] |

[a]Until 15 cm is wound, peeling does not occur for even five test pieces
[b]Peeling occurs at sites of 51, 42, 50 mm from time when three of five test pieces each starts to wind

INDUSTRIAL APPLICABILITY

The flexible laminate of the present invention can be suitably used for applications requiring the high flexibility and durability of the flexible display or the like.

REFERENCE SIGNS LIST

10 Flexible display
12 Flexible laminate
12a One end portion of flexible laminate 12
12b Other end portion of flexible laminate 12
12c Intermediate portion of flexible laminate 12
12d Curvature end portion on one side of flexible laminate 12
12e Curvature end portion on the other side of flexible laminate 12
14, 16, 18, 20 Hard layer
14a One end portion of hard layer 14

14b Other end portion of hard layer 14
16a One end portion of hard layer 16
16b Other end portion of hard layer 16
18a One end portion of hard layer 18
18b Other end portion of hard layer 18
20a One end portion of hard layer 20
20b Other end portion of hard layer 20
22, 24, 26 Intermediate layer
30, 32, 34, 36 Neutral plane formed at the time of folding
40, 42 Curvature portion
44, 46 Linear portion
50, 52, 54, 56, 58, 60, 62, 64, 66, 68 Support means

The invention claimed is:

1. A flexible laminate, which has at least one unit of a laminated structure in which two hard layers closely adhere to each other with at least one intermediate layer therebetween, wherein when the flexible laminate is bent, neutral planes are formed inside each of the hard layers that closely adhere to each other with the intermediate layer therebetween, and the flexible laminate satisfies the following expression:

$$a \times \ln(\tan \delta \times E_T/0.01) \geq 100$$

wherein a is a physical property value inherent to the hard layer, tan δ represents a loss factor of a substance configuring the intermediate layer, and $E_T$ represents an elastic modulus (MPa) of the substance configuring the intermediate layer, and is defined by an apparent elastic modulus obtained by dividing a true stress by a true strain after a stress/strain curve is converted into a true stress/true strain curve when a tensile tester performs a tensile test under the condition that room temperature is 25° C. and a strain rate is 0.0525 (1/s);

wherein the hard layer is a substrate selected from a polyethylene terephthalate (PET), polyimide (PI), glass, cycloolefine polymer or a polymethyl methacrylate, and when the substrate is the PET, PI, glass, cycloolefine polymer or the polymethyl methacrylate, a is 500, 500, 1200, 900 or 900, respectively; and wherein the intermediate layer is a cured product formed of a curable silicone composition that includes (A) a linear or branched organopolysiloxane having at least one alkenyl group in a molecule on average, (B) an organopolysiloxane resin, (C) an organohydrogenpolysiloxane having at least two Si—H bonds in a molecule, and (D) a hydrosilylation reaction catalyst.

2. The flexible laminate according to claim 1, wherein in the case in which the flexible laminate is bent, a storage elastic modulus G' of the substance configuring the intermediate layer at 0.1 Hz and 25° C. is in a range of 1.0 kPa to 1 M (1000 k) Pa, and the storage elastic modulus G' at 10.0 Hz and 25° C. of the substance configuring the intermediate layer is twice or more the storage elastic modulus G' at 0.01 Hz and at 25° C.

3. The flexible laminate according to claim 1, wherein the loss factor tan δ at 1 Hz of the substance configuring the intermediate layer included in the flexible laminate is in a range of 0.2 to 5.0 in a range of −40° C. to 100° C.

4. The flexible laminate according to claim 1, wherein the elastic modulus $E_T$ of the substance configuring the intermediate layer included in the flexible laminate is in a range of 0.050 to 0.200 MPa.

5. The flexible laminate according to claim 1, wherein the hard layer and the intermediate layer are selected so that the value of a is in the range of 200 to 2000, and the storage elastic modulus G' of the substance configuring the intermediate layer at 1.0 Hz and −20° C. is three times or more the storage elastic modulus G' at 1.0 Hz and at 25° C.

6. The flexible laminate according to claim 1, wherein the organopolysiloxane resin (B) is formed of a unit (M unit) of $R_3SiO_{1/2}$ wherein R represents monovalent organic groups independently of each other and a $SiO_{4/2}$ unit (Q unit), and has or does not have a hydroxyl group or a hydrolyzable group.

7. The flexible laminate according to claim 1, wherein the curable silicone composition is a hydrosilylation reaction curing type.

8. The flexible laminate according to claim 1, wherein at least one of the hard layers closely adhering to each other with the intermediate layer therebetween is a light emitting layer, and the other of the hard layers is selected from a support layer, an optical functional layer, a protective layer, and a transparent electrode layer.

9. A flexible display provided with the flexible laminate according to claim 8.

* * * * *